US006150493A

United States Patent [19]
Hait et al.

[11] Patent Number: 6,150,493
[45] Date of Patent: Nov. 21, 2000

[54] PROCESS FOR THE PREPARATION OF POLY(ESTER-CARBONATE)S

[75] Inventors: Sukhendu B. Hait; Swaminathan Sivaram, both of Pune, India

[73] Assignee: General Electric Company, Schenectady, N.Y.

[21] Appl. No.: 08/934,628

[22] Filed: Sep. 19, 1997

[30] Foreign Application Priority Data

Jun. 12, 1997 [IN] India ............................. 1564/DEL/97

[51] Int. Cl.$^7$ ................................................. C08G 64/00
[52] U.S. Cl. ............................ 528/196; 528/176; 526/65
[58] Field of Search .................... 528/176, 196; 526/65

[56] References Cited

U.S. PATENT DOCUMENTS

| | | | |
|---|---|---|---|
| 4,831,108 | 5/1989 | Richardson et al. | 528/335 |
| 4,994,546 | 2/1991 | Stern et al. | 528/194 |
| 5,164,478 | 11/1992 | Lee et al. | 528/481 |
| 5,266,659 | 11/1993 | Sivaram et al. | 525/463 |
| 5,288,838 | 2/1994 | Sivaram et al. | 528/199 |
| 5,340,908 | 8/1994 | Idage et al. | 528/275 |
| 5,510,454 | 4/1996 | Stouffer et al. | 528/308.1 |

FOREIGN PATENT DOCUMENTS

| | | | |
|---|---|---|---|
| 0 030 393 | 6/1991 | European Pat. Off. | C12N 9/24 |
| 0 200 949 | 6/1907 | Germany . | |
| 1-247420 | 10/1989 | Japan | C08G 63/22 |

OTHER PUBLICATIONS

Fakirov, "Sequential Reordering in Condensation Copolymers, 1 Melting– and Crystallization–induced Sequential Reordering in Immiscible Blends of Poly(ethylene terephthalate) with Polycarbonate or Polyarylate," *Macromolecular Chemistry and Physics*, 197, pp. 2837–2867 (1996).

Ignatov, et al., "PET/PC Blends and Copolymers by One–Step Extrusion: 1. Chemical Structure and Physical Properties of 50/50 Blends," *Polymer*, vol. 38, No. 1, pp. 195–200 (1997).

Pilati, "Solid–State Polymerization," *Comprehensive Polymer Science*, vol. 5, Pergamon Press, Oxford, pp. 201–216 (1989).

Suzuki, et al., "Miscibility and Transesterification in Bisphenol A Polycarbonate/Poly (ethylene terephthalate) Blends," *Polymer*, vol. 30, pp. 1287–1297 (1989).

*Primary Examiner*—Terressa Mosley-Boykin
*Attorney, Agent, or Firm*—Noreen C. Johnson; Douglas E. Stoner

[57] ABSTRACT

The invention relates to a process for the preparation of poly (ester-carbonate)s from the corresponding oligomers, using solid state polymerization process, which comprises mixing the desired oligomers in a suitable solvent or non-solvent, adding a suitable catalyst to this mixture, refluxing the mixture for a period of 1 to 8 hours, removing the solvent by known methods, polymerization the oligomer mixture in the solid state either in presence of vacuum or under a flow of inn gas at a temperature ranging between 180–240° C. for a period of 5 to 20 hours to obtain the product.

16 Claims, No Drawings

PROCESS FOR THE PREPARATION OF POLY(ESTER-CARBONATE)S

CROSS-REFERENCE TO RELATED APPLICATIONS

This application claims foreign benefit to an Indian Patent application filed on Jun. 12, 1997 entitled "A PROCESS FOR THE PREPARATION OF POLY(ESTER-CARBONATE)S" to Sukhendu B. Hait and Swaminathan Sivaram with Ser. No. 1564\DEL\97.

FIELD OF THE INVENTION

This invention relates to a process for the preparation of Poly (ester-carbonate)s. More particularly, it relates to preparation of these poly (ester-carbonates)s by polymerization in the solid state.

BACKGROUND OF THE INVENTION

Poly (ester-carbonate)s are a class of engineering plastics which are commercially produced by the industry and find application as high performance materials. The introduction of carbonate linkage in the matrix of a polyester has the beneficial effect of improving processability, reducing the glass transition temperature and improving impact strength. The ester component of the poly (ester-carbonate)s can be derived either from poly (arylester) or a poly (alkylester).

PRIOR ART REFERENCES

Poly (ester-carbonate)s can be prepared by a melt polycondensation reaction involving bisphenol-A, phenyl esters of aromatic dicarboxylic acids and diphenyl carbonate at high temperatures and low pressures in presence of a catalyst. In this process, phenol is continously distilled from the reaction to drive the process to completion. Processes of this type are described in Japan Pat. 01,247,420 (1989), Japan Pat. 8098,228 (1980) and Eur.Pat.Appl. 303,93 (1989).

Poly (arylester-carbonate)s can also be prepared by an interfacial polymerization process wherein the sodium salt of bisphenol-A is reacted with a mixture of aromatic dicarboxylic acid chlorides and phosgene in a two phase medium, consisting of water and a chlorinated solvent, such as methylene chloride. Such processes are described in Ger. Pat. 2,009,49 (1971) and by G. S. Kolensnikov et al. in Vysokomol, Soedin. Ser.B. Vol.9, p.49,1967.

Poly (alkylester-carbonate)s are conveniently prepared by a process of reactive blending, in which mixtures of respective homopolymers, namely poly(ethylene terepthalate) or poly (butylene terephthalate) are melt blended with poly (arylcarbonate) in the barrel of an extruder, in presence of suitable catalyst which can promote an ester-carbonyl interchange reaction. Such blending is best carried out in a twin-screw corotating extruder at 270–280° C. The product thus obtained are poly (alkyester-carbonate)s. This process has the advantage that it is very flexible, versatile and requires low capital investment. These types of processes are well described in the prior art (V. N. Ignatov et.al, Polymer, Vol.38, 195–200, 1997; T. Suzuki et.al, Polymer, Vol.30. p.1287–1297, 1989; S. Fakirov et.al, Macromol. Chem. Phys.vol. 197,2837,1996).

Solid state polymerization is a process widely practised to increase the molecular weight of the low molecular weight oligomers of poly (ester)s and poly(arylcarbonate)s. In this process, oligomers are subjected to various treatment to induce crystallinity and polymerized in the solid state at a temperature higher than the glass transition temperature of the polymer but below the melting point of the polymer, either in vacuum or in presence of an inert gas flow, whereupon molecular weight increase in the solid state occurs.

The advantage of the process is that the reation is conducted at relatively lower temperatures, without melting the oligomer or the polymer. Accordingly, no undesirable degradation reaction occurs and polymers with good physical properties are obtained. Solid state polymerization of oligomers of poly(alkylester)s, poly(arylester)s and poly (arylcarbonate)s are described in the prior art U.S. Pat. No. 5,510,454 describes an efficient process for the thermal crystallization of poly(ethylene terephthalate) oligomers having an inherent viscosity (IV) in the range of 0.10 to 0.36 and their solid state polymerization. At 240° C., and in 24 h, the IV could increased from 0.18 to 1.14. Similarly, U.S. Pat. Nos. 4,94,871 and 5,266,659 describe solid state polymerization of poly (arylcarbonate ) oligomers. U.S. Pat. Nos. 4,994,546 and 5,164,478 describe solid state of polymerization of poly (arylester) oligomers which have been crystalized using a suitable non-solvent. However, in none of the above patents, which are incorporated herein as references, copolymerization of an ester and carbonate containing oligomers to form poly(ester-carbonate)s in the solid state polymerization is either disclosed or implied.

However, all the forgoing processes suffer from many disadvantages. The interfacial process uses phosgene as well as organic chlorinated solvents both of which are toxic and enviromentally polluting. In addition, in the interfacial process large amount of chloride waste as inorganic salt is formed which poses problems in disposal. The melt processes are conducted at high temperatures during which undesirable degradation of the polymer occurs. This leads to poor colour and physical properties. Furthermore, the melt processes involve handling of high viscosity melts, which lead to complicated processing equipment. The reactive process, although simple, has the disadvantage that the constituent polymers are subjected to a second thermal history. Additionally, presence of catalyst residues in the constituent polymers result in poor control of the ester-carbonate inter-change reaction. Such reactive blending processes are always accompanied by the formation of varible quantities of gel (crosslinked polymer) which are undesirable.

OBJECT OF THE INVENTION

The object of the present invention is to provide an improved process for the preparation of wide range of poly (ester-carbonate)s which obviates many of the disadvantages of the hitherto known processes and to provide a product with good physical properties, avoiding the use of toxic and non environment friendly chemicals.

SUMMARY OF THE INVENTION

The above objects are acheived by providing a process for the preparation of poly (ester-carbonate)s, from the corresponding oligomers, using solid state polymerization process, which comprises mixing the desired oligomers in a suitable nonsolvent,adding a suitable catalyst to this mixture, refluxing the mixture for a period of 1 to 8 hours, removing the non solvent by known methods, polymerizing the oligomer mixture in the solid state, either in presence of vacuum or under a flow of inert gas a temperature between 180 to 240° C. for a period of 5 to 20 hours to obtain the product.

DETAILED DESCRIPTION

Accordingly, the present invention provides an improved process for the preparation of poly (ester-carbonate)s, from the corresponding oligomers, using solid state polymerization process, which comprises mixing the desired oligomers in a suitable nonsolvent, adding a suitable catalyst to this mixture, refluxing the mixture for a period of 1 to 8 hours, removing the nonsolvent by conventional methods, polymerizing the oligomer mixture in the solid state, either in presence of vacuum or under a flow of inert gas a temperature between 180 to 240° C. for a period of 5 to 20 hours to obtain poly (ester-carbonate)s.

In an embodiment of the present invention, the oligomers used may be selected from Poly (aryl carbonate)s, Poly (aryl ester)s, Poly(alkyl ester)s exemplified by bisphenol-A polycarbonate, bisphenol-A polyesters, poly (ethylene terephthalate), poly (butylene terephthalate) and poly (ethylene 2,6-naphthalate).

In another embodiment, the non-solvent used may be selected from ketones such as acetone and methyl ethyl ketone, esters such as ethyl acetate and butyl acetate, aromatic hydrocarbons such as toluene, xylene and cholrobenzene. The non solvent used in the present reaction is removed by any known methods and a person having average skill will not have any difficulty in doing this step.

In yet another embodiment, the catalyst used may be selected from the oxides of antimony, lead, or germanium, alkoxides and aryloxides of Group IV metals, alkoxides of Lanthanide Group of metals, and alkoxides and esters of tin.

In another embodiment, the oligomer has an inherent viscosity (IV) value between 0.10 to 0.40 dL/g, preferably 0.20 to 0.30 dL/g as measured in chloroform at 30° C. or in 60:40 phenol-tetrachloroethane at 30° C.

In still another embodiment, the oligomers have an hydroxyl content in the range 30–80% perferably 30 to 70% but not less than 30%.

In another embodiment, the amount of catalyst may be in the range of 15 to 2000 ppm.

In another embodiment, the inert gas used may be selected from nitrogen, argon or carbon dioxide.

In a feature of the present invention, the oligomer suitable for solid state polymerization may be prepared by a number of methods which are well documented in the prior art. Poly (alkylester)s can be prepared by the melt phase reaction of either aromatic dicarboxylic acid of their dialkyl (ester)s with aliphatic or alicyclic diols (F. Pilati in G. Allen et.al, Ed., Comprehensive Polymer Science, Vol.5, p.201–216, Pergamon Press, Oxford 1989). Suitable aromatic dicarboxylic acids are terephthalic acid, isophthalic acid and 2,6-naphthalenedicarboxylic acid. Diols can be chosen amongst ethylene glycol 1,3-propylene glycol, 1,4-butane diol and 1,4-cyclohexanedimethanol. Poly(arylcarbonate) oligomers can be prepared by a melt phase reaction of bisphenol-A with diphenyl carbonate (U.S. Pat. No. 5,288,838). Poly (arylester) oligomers can be prepared by a melt phase reaction of bisphenol-A with phenyl or methyl esters of terephthalic acid/isophthalic acids. Such processes have been described in the prior art(U.S. Pat. No. 5,340,908).

In the case of poly (arylcarbonate)s and poly (arylester)s, the bisphenol-A can be replaced partially or wholly, by other aromatic dilhydric phenols. Examples of other aromatic dihydric phenols are hydroquinone, 4,4'-dihydroxybiphenyl, 4,4'-dihydroxydiphenyl ether, 4,4'-dihydroxydiphenyl sulfoxide, 4,4'-dihydroxy-3,3'-dimethyldiphenyl and 4,4,-dihydroxydiphenyl sulfone.

The oligomers of poly (arylcarbonate) and poly (arylester) or poly (alkylester), can be mixed in any proportion, ranging between 0–100 wt %. Generally. the composition of the final poly (ester-carbonate) is determined by the composition of the oligomer used in the solid state polymerization. Thus, a 50 wt % composition of poly (arylcarbonate) oligomer and poly (arylester) or poly (alkylester) oligomer will result in a poly (ester-carbonate) wherein the relative proportion of ester to carbonate linkage is 50:50 wt%. The oligomers are physically mixed and slurried in a non-solvent. Suitable non-solvents are ketones such as acetone and methyl ethyl ketone, esters such as ethyl acetate and butyl acetate, aromatic hydrocarbons such as toluene, xylene, and chlorobenzene. Optionally the solvents containing the mixture of oligomers can be heated to a temperature range of 40–120° C., preferably between 40–60° C. for a period of 1–8 hours, preferably 1–4 hours. These non-solvents are known in the prior art to induce some crystallinity to oligomers of poly (arylcarbonate)s, poly (arylester)s and poly (alkylester)s.

In another feature, it is often necessary to use a catalysts to accelerate the solid state polymerization process. Such catalysts are selected from a wide range of materials, well known as catalyst for the melt polymerization of these class of polymers. These catalyst can be chosen from amongst the following: oxides of antimony, lead, or germanium, alkoxides and aryl oxides of Group IV metals, alkoxides of Lanthanide Group of metals, and alkoxides and esters of tin. The catalyst concentration is typically between 15 ppm to 2000 ppm, preferably between 25–1000 ppm. The catalyst can be conveniently dispersed with the oligomer by adding it to the slurry of the oligomers in the non-solvents.

In yet another feature of the present invention, the non-solvent can be distilled to generate solid oligomer powder. The distilled non-solvent can be reused in the process.

The oligomeric mixture in the form of a dry and containing the catalyst is now suitable for use in solid state polymerization.

Solid state polymerization can be conducted by any of the prior art methods. For example the mixture of oligomers can be subjected to programmed increase of temperature from 180–230° C., either under a flow of inert gas or a vacuum. Any inert gas such as $N_2$ argon or carbon dioxide can be used. A vacuum ranging from 100 mm to 1 mmHg is suitable. Typically, the powder is maintained at 180° C. for 1 to 2 hours followed by heating at 200° C. for 1 to 4 hours and 220° C. for 1 to 4 hours and 230° C. for 1 to 10 hours. The temperature and time profile determine the reaction rate as well as the final molecular weight of the poly (ester carbonate). At no point of time during solid state copolymerization process, the powders melt or undergo fusion.

The major advantages of the solid state polymerization process are that it involves relatively low temperatures, is solvent free and produces no effluents. There is no need for special equipments to handle the higher viscosities of the polymer encountered in the melt process. In view of the low temperatures used, there is no undesirable polymer degradation leading to loss of properties. The process is surprisingly free of gelation or crosslinking.

The products of solid state copolymerization are poly (ester-carbonate)s with high molecular weights as characterised by inherent viscosity values of 0.50 to 1.0 dL/g. The increase in polymer molecular weight is accompanied by interchange reactions, amongst the oligomers used as starting material. This is evidenced by thermal analytical measurements and nuclear magnetic resonance spectroscopy of the resultant poly (ester-carbonate)s. The relative weight proportion of ester to carbonate it the product namely poly (ester-carbonate) is determined by relative wt % of poly (arylcarbonate) and poly (arylester) or poly (alkylester) oligomer in the feed to the solid state polymerization reaction.

The process of the present invention is described by the examples given below which are illustrative only and should not be construed to limit the scope of the present invention in any manner.

EXAMPLE 1

Poly (arylcarbonate) oligomer, IV=0.17 dL/g (6 g) and poly (ethylene terephthalate) oligomer, IV=0.14 dL/g (6 g) were taken in a 100 mL round bottom flask slurried in ketone (50 mL) containing antimony trioxide (1000 ppm) as catalyst and refluxed for 4 h. Acetone was evaporated and the oligomer mixture was dried under vacuum at 60° C. for 4 h. The oligomer mixture had an inherent viscosity of 0.14 dL/g, $T_g$=71° C. and $T_m$=220 and 247° C.

The solid state copolymerization reaction of the oligomer mixture was performed in a glass reactor, immersed in an oil bath. Nitrogen was bubbled through the bed of powder at 2 L/min. The oligomer mixture (3 g) was placed in the reactor and was heated slowly from room temperature to 180° C. over a period of 1 h and maintained at 180° C. for an additional period of 1 h. Thereafter, the temperature was increased to 200° C./3 h, 220° C./4 h. The final, poly (ethylene terephthalate-carbonate) showed IV=0.71 dL/g, $T_g$=93° C. and $T_m$=245° C.

EXAMPLE 2

Poly (arylcarbonate) oligomer,(IV=0.17 dL/g) 6 g and poly (ethylene terephthalate) oligomer, (IV=0.14 dL/g) 6 g were taken in a 100 mL round bottom flask was slurried in acetone (50 mL) containing antimony trioxide (1000 ppm) and refluxed for 4 h. Acetone was evaporated and the oligomer dried under vacuum at 60° C. for 4 h. The mixture of the oligomers thus obtained showed an IV=0.14 dL/g, $T_g$=71° C. and $T_m$=215 and 247° C.

The solid state copolymerization reaction of the oligomer mixture was performed in a glass reactor, immersed in an oil bath. Nitrogen was bubbled through the bed of powder at 2 L/min. The oligomer mixture (3 g) was placed in the reactor and was heated slowly from room temperature to 180° C. over a period of 1 h and maintained at 180° C. for an additional period of 1 h. Thereafter, the temperature was increased to 200° C. (3h), 220° C. (4 h) and 230° C. (7 h). The inherent viscosity of the poly (ethylene terephthalate-carbonate) was 0.84 dL/g, $T_g$=95° C. and $T_m$=248° C.

EXAMPLE 3

Poly (arylcarbonate) oligomer, (IV=0.44 dL/g) 6 g and poly (ethylene terephthalate) oligomer, (IV=0.65 dL/g) 6 g were taken in a 100 mL round bottom flask, slurried in acetone (50 mL) containing dibutyltin dilaurate (100 ppm) and refluxed for 4 h. Acetone was evaporated and the oligomer dried under vacuum at 60° C. for 4 h. The mixture of the oligomers thus obtained showed an IV=0.55 dL/g, $T_g$=89 and 136° C. and $T_m$=219 and 252° C.

The solid state copolymerization reaction of the oligomer mixture was performed in a glass reactor, immersed in an oil bath. Nitrogen was bubbled through the bed of powder at 2 L/min. The oligomer mixture (3 g) was placed in the reactor and was heated slowly from room temperature to 180° C. over a period of 1 h and maintained at 180° C. for an additional period of 1 h. Thereafter, the temperature was increased to 200° C. (4 h), 210° C. (4 h), 215° C. (2 h), 220° C. (2 h), 225° C. (2 h) and 230° C. (7 h). The inherent viscosity of the poly (ethylene terephthalatecarbonate) was 0.93 dL/g, $T_g$=103° C. and $T_m$=238° C.

EXAMPLE 4

Poly (arylcarbonate) oligomer, (IV 0.17 dL/g) 6 g and poly (ethylene terephthalate) oligomer, (IV=0.17 dL/g) 6 g were taken in a 100 mL round bottom flask, slurried in acetone (50 mL) containing titanium isopropoxide (100 ppm) and refluxed for 4 h. Acetone was evaporated and the oligomer dried under vacuum at 60° C. for 4 h. The mixture of the oligomers thus obtained showed an IV=0.17 dL/g $T_g$=69 and 136° C. and $T_m$=209 and 241° C.

The solid state copolymerization reaction of the oligomer mixture was performed in a glass reactor, immersed in an oil bath. Nitrogen was bubbled through the bed of powder at 2 L/min. The oligomer mixture (3 g) was placed in the reactor and was heated slowly from room temperature to 180° C. over a period of 1 h and maintained at 180° C. for an additional period of 1 h. Thereafter, the temperature was increased to 210° C. (4 h), 220° C. (4 h).The inherent viscosity of the poly (ethylene terephthalate-carbonate) was 0.70 dL/g, $T_g$=103° C. and $T_m$=238° C.

EXAMPLE 5

Poly (arylcarbonate) oligomer, (IV=0.17 dL/g) 6 g and poly (ethylene terephthalate) oligomer, (IV=0.17 dL/g) 6 g were taken in a 100 mL round bottom flask, slurried in acetone (50 mL) containing titanium isopropoxide (100 ppm) and refluxed for 4 h. Acetone was evaporated and the oligomer dried under vacuum at 60° C. for 4 h. The mixture of the oligomers thus obtained showed an $\eta_{inh}$=0.17 dL/g, $T_g$=69 and 136° C. and $T_m$=209 and 241° C.

The solid state copolymerization reaction of the oligomer mixture was performed in a glass reactor, immersed in an oil bath. Nitrogen was bubbled through the bed of powder at 2 L/min. The oligomer mixture (3 g) was placed in the reactor and was heated slowly from room temperature to 180° C. over a period of 1 h and maintained at 180° C. for an additional period of 1 h. Thereafter, the temperature was increased to 210° C. (4 h),220° C. (4 h) and 230° C. (6 h). The inherent viscosity of the poly (ethylene terephthalate-carbonate) was 0.99 dL/g, $T_g$=103° C. and $T_m$=239° C.

EXAMPLE 6

An oligomer of poly (aryl carbonate) (IV=0.17 dL/g) (6 g) and poly (arylester) (IV=0.19 dL/g) (6 g) was slurried in ethyl acetate (50 mL) containing 100 ppm dibutyltin dilaurate. The slurry was refluxed for 4 h. Ethyl acetate was evaporated and the oligomer mixture was dried under vacuum at 60° C. for 4 h. The mixture of the oligomers thus obtained showed an IV=0.18 dL/g, $T_g$=130° C. and $T_m$=210° C.

The solid state copolymerization reaction of the oligomer mixture was performed in a glass reactor, immersed in an oil bath maintained at a constant temperature. Three grams of the crystallized oligomer mixture was placed in the reactor, the pressure was reduced to 0.1 mm of Hg and the mixture was heated slowly from room temperature to 180° C. over a period of 1 h and the sample was then retained at 180° C. for 1 h. Further, reaction was performed at 200° C. (1 h), 210° C. (4 h) and 220° C. (4 h). The final poly (ethylene terephthalate-carbonate) showed an 0.43 dL/g with $T_g$=159° C. and $T_m$=233° C.

EXAMPLE 7

An oligomer of poly (aryl carbonate) (IV=0.17 dL/g) (6 g) and poly (aiylester) (IV=0.19 dL/g) (6 g) was slurried in ethyl acetate (50 mL) containing 100 ppm dibutyltin dilaurate. The slurry was refluxed for 4 h. Ethyl acetate was evaporated and the oligomer mixture was dried under vacuum at 60° C. for 4 h. The mixture of the oligomers thus obtained showed an IV=0.18 dL/g, $T_g$=130° C. and $T_m$=210° C.

The solid state copolymerization reaction of the oligomer mixture was performed in a glass reactor, immersed in an oil bath maintained at a constant temperature. Three grams of the crystallized oligomer mixture was placed in the reactor, the pressure was reduced to 0.1 mm of Hg and the mixture was heated slowly from room temperature to 180° C. over a period of 1 h and the sample was then retained at 180° C. for 1 h. Further, reaction was performed at 200° C. (1 h), 210° C. (4 h) and 220° C. (4 h) and finally at 230° C. for (2 h). The final poly (ethylene terephthalate-carbonate) showed an 0.52 dL/g, with $T_g$=163° C. and $T_m$=243° C.

What is claimed is:

1. A process for the preparation of poly(ester-carbonate)s which comprises:

mixing poly(arylcarbonate) and poly(arylester) or poly (alkylester) oligomers in a non-solvent, adding a catalyst to the mixture thus formed, refluxing the mixture for a period of 1 to 8 hours, removing the non-solvent from said mixture, and polymerizing said mixture for a period of 5–20 hours in the solid state in vacuum or under a flow of inert gas, at a temperature higher than the glass transition temperature of said mixture but below its melting point.

2. A process according to claim 1 wherein the solid state polymerization temperature is in the range of 180–240° C.

3. A process as claimed in claim 1 wherein the poly (arylcarbonate) oligomer is a bisphenol-A polycarbonate oligomer.

4. A process as claimed in claim 1 wherein the poly (arylester) or poly(alkylester) oligomers are selected from the group consisting of bisphenol-A polyester, poly(ethylene terephthalate), poly(butylene terephthalate) and poly (ethylene 2,6-naphthalate) oligomers.

5. A process as claimed in claim 1 wherein the non-solvent is selected from the group consisting of ketones, esters and aromatic hydrocarbons.

6. A process as claimed in claim 5 wherein the non-solvent is selected from the group consisting of acetone, methyl ethyl ketone, ethyl acetate, butyl acetate, toluene, xylene and chlorobenzene.

7. A process as claimed in claim 1 wherein the catalyst is selected from the group consisting of antimony, lead and germanium oxides, Group IV metal alkoxides and aryloxides, lanthanide group alkoxides and tin alkoxides and esters.

8. A process as claimed in claim 1 wherein the amount of catalyst used is in the range of 15–2,000 ppm.

9. A process as claimed in claim 1 wherein the oligomers have inherent viscosities in the range of 0.10–0.40 dL/g as measured in chloroform at 30° C. or in 60:40 phenol-tetrachloroethane at 30° C.

10. A process as claimed in claim 9 wherein the oligomers have inherent viscosities in the range of 0.20–0.30 dL/g.

11. A process as claimed in claim 1 wherein the oligomers have an hydroxyl content in the range of 30–80%.

12. A process as claimed in claim 11 wherein the oligomers have an hydroxyl content in the range of 30–70%.

13. A process as claimed in claim 12 wherein the oligomers have an hydroxyl content not less than 30%.

14. A process as claimed in claim 1 wherein the solid state polymerization is performed in vacuum.

15. A process as claimed in claim 1 wherein the solid state polymerization is performed under a flow of inert gas.

16. A process as claimed in claim 15 wherein the inert gas is nitrogen, argon or carbon dioxide.

* * * * *